United States Patent [19]

Stössel

[11] Patent Number: 4,623,790

[45] Date of Patent: Nov. 18, 1986

[54] APPARATUS FOR DIGITAL ANGULAR MEASUREMENT

[75] Inventor: Hans R. Stössel, Rebstein, Switzerland

[73] Assignee: Wild Heerbrugg AG, Heerbrugg, Switzerland

[21] Appl. No.: 584,769

[22] Filed: Feb. 29, 1984

[30] Foreign Application Priority Data

Mar. 3, 1983 [CH] Switzerland .................. 1167/83

[51] Int. Cl.$^4$ .............................................. G01D 5/34
[52] U.S. Cl. .......................... 250/231 SE; 250/237 G
[58] Field of Search ................ 356/395; 250/231 SE, 250/231 R, 237 G; 340/347 P

[56] References Cited

U.S. PATENT DOCUMENTS 4,224,603  9/1980  Lallemand .................... 250/231 SE
4,233,592  11/1980  Leichle ............................ 340/347 P Primary Examiner—David C. Nelms
Assistant Examiner—S. Allen
Attorney, Agent, or Firm—Roylance, Abrams, Berdo & Goodman

[57] ABSTRACT

In an apparatus for the digital measurement of an angle means are provided for a course and a fine measurement. For the course measurement, full intervals of a generated periodical signal are counted, and for the fine measurement, a reference mark is provided within the periodical signals. For this purpose, legs of the angle to be measured are defined by two parts e.g. a stator and a rotor which are rotatably mounted with respect to one another about a common axis or shaft. A disk rotating at a constant angular velocity about the same axis, with constant angular velocity supports a circular graduation made up of equidistant radial lines or sectors and gaps. Lines and gaps are sensed by appropriate sensor or pick-up elements. The above said reference mark is realized by disturbing the line width. One edge of all the scale divisions still represents an undisturbed equidistant division extending over the entire disk circle and which is used for course phase measurement. The mark disturbance only consists of a displacement of the other edge and is used for fine measurement.

11 Claims, 1 Drawing Figure

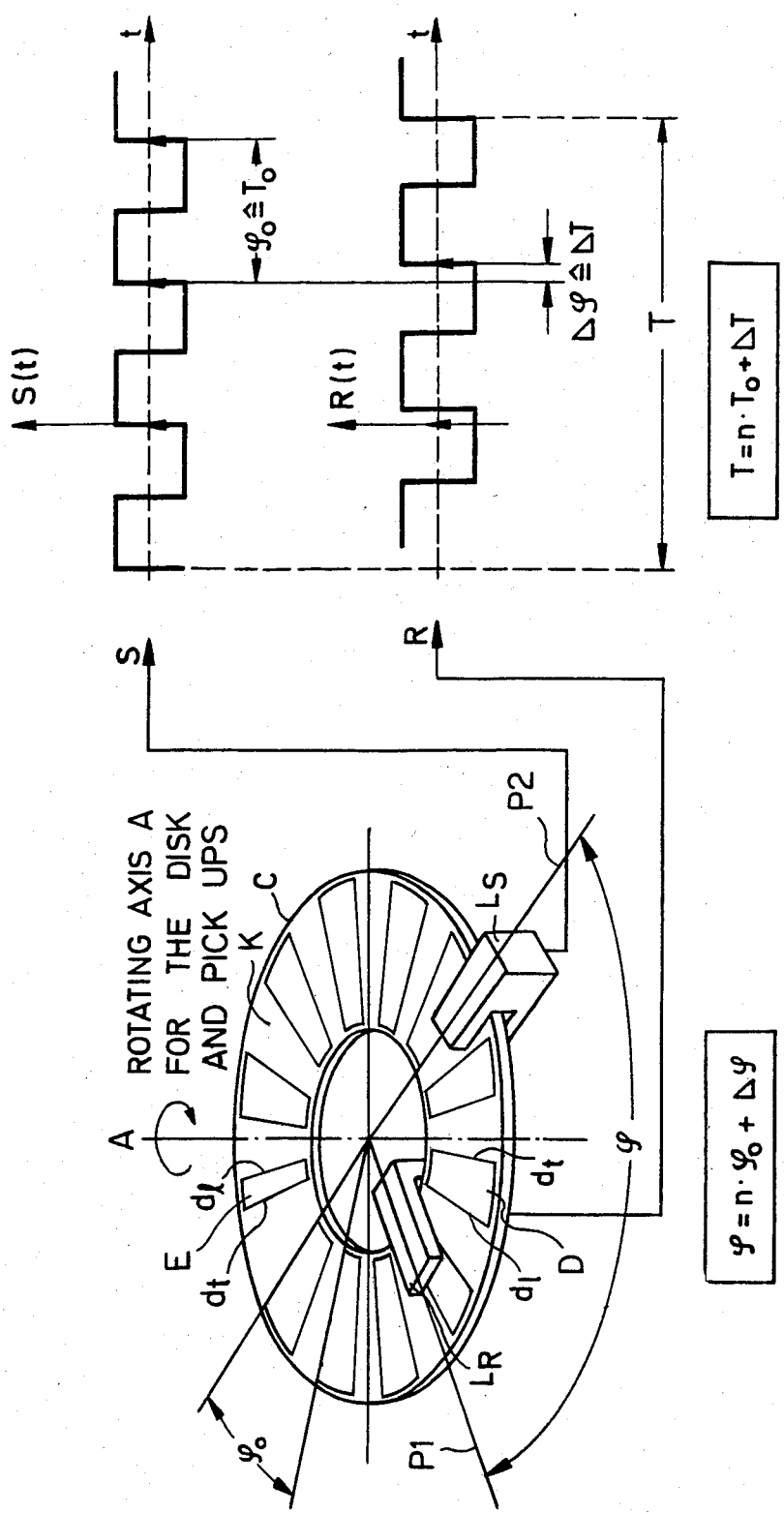

APPARATUS FOR DIGITAL ANGULAR MEASUREMENT

BACKGROUND OF THE INVENTION

The present invention relates to an apparatus for the digital measurement of an angle, the legs of which are materialized or defined by two mechanical parts, hereafter called stator and rotor respectively, which are rotably mounted with respect to each other about a common axis or shaft. A disk rotating about the same shaft with constant angular velocity supports a circular graduation made up of equidistant radial lines and gaps. Lines and gaps for example, may be distinguished by any mechanical, optical, electrical or magnetical property and can be sensed by appropriate sensors or pick-up elements. At least one stator-fixed pick-up and at least one rotor fixed pick-up, provide one or more pairs of ac-signals, the phase difference of which varies by $2\pi$, while the rotor revolves by one graduation interval with respect to the stator.

The measurement of this phase difference gives an interpolation of the graduation interval (fine measurement), whilst the number of entire intervals contained in the angle to be measured is still unknown.

Constructions are known in which, apart from the circular graduation the rotating disk contains an individual reference mark, which is scanned by two additional pick-up elements, one of which being stator-fixed and the other rotor-fixed. The still unknown number of entire graduation intervals (course measurement) is obtained by counting the cycles of one graduation signal between successive passages of the zero mark on the stator-fixed and rotor-fixed pick-up elements.

In addition, solutions are known in which the zero mark is integrated into the graduation and is realized by omitting one graduation mark, obviating the additional pick-up elements. However, additional expense is incurred to reconstruct the missing signal cycle for the fine measurement.

For the purpose of the course measurement, the reference mark must appear once on the stator-fixed pick-up element and once on the rotor-fixed pick-up. This involves an observation time which, in the least favorable case, involves a complete rotation of the disk circle, which is prejudicial in certain cases. In the case of a theodolite-like instrument, the same evaluation electronics must alternately measure two angles about different axes (azimuth and elevation). This must take place in a rapid sequence when surveying (approximately 2 to 4 complete measurements per second). This leads to the wish of obtaining the coarse information from a fraction of a complete disk rotation.

DESCRIPTION OF THE DRAWING

The drawing is a schematic representation of a typical apparatus adapted to provide the measurement of the present invention.

DESCRIPTION OF THE INVENTION

The aim of the invention is to satisfy the above wish, whilst then reducing the aforementioned additional expenditure. These difficulties are obviated in that the reference mark E is not obtained by omitting a graduation line, but merely by disturbing or unambiguously coding the width of certain graduation lines or marks D, separated by spaces K in such a way that one edge of all the graduation lines still represents an undisturbed equidistant graduation over the entire circle of the disk which is used for fine measurement, whilst the mark disturbance only involves a displacement of the other edge. Tolerance considerations make it obvious to choose approximately $\frac{2}{3}$ or $\frac{1}{3}$ of the interval as the line width of the undisturbed and disturbed line, respectively.

The drawing shows as an example, a typical apparatus for accomplishing the required measurement of an angle. Circle C has, for example, magnetically detectable scale divisions D, separated by an angle $\phi_o$. A pick-up LR is fixedly coupled to the rotor P1 and detects the position of the circle relative to the rotor by detecting the passage of the divisions D thereby. Likewise, another pick-up SR is fixedly coupled to the motor P2 and detects stator position relative to the circle C in the same manner. Both pick-ups are movable relative to each other about axis A and to the circular reading acale or disk C, which disk rotates at a constant angular velocity about axis A. Each division has a respective leading and trailing edge dl and dt, which produce respective alternating current wave form responses R and S at the outputs of the pick-up elements LR and LS as shown. The phase difference between R and S, as determined by the time difference $\Delta T$ therebetween, provides a measure of the angle $\phi$ therebetween over a time interval T according to the relation:

$$T = n \cdot T_o + \Delta T$$

$T_o$ is a period of the wave form.
n is the number of periods.
$\Delta T$ is the phase difference.

According to the invention, the coarse information is obtained by providing N equidistant reference marks, N advantageously being a power of 2:
$$N = 2^n.$$

If $n > 1$, the reference mark must be coded. According to a first embodiment of the invention, this is achieved in that the reference marks are constituted by groups of $n+1$ successive graduation lines, the first of which always being disturbed, whilst the states of the n following graduation lines represent a binary code, which numbers the reference mark.

In the second embodimant of the invention, each reference mark consists of two successive graduation lines whereof the first is always disturbed, and the state of the second represents a code bit. The code bits of all the reference marks form a cyclic code, which is such that random n successive code bits form a word which is unique on the circle.

Such codes for various n are known. They can e.g. be produced with shift counters (shift registers with aporopriate feedback). Thus, with a 6-bit shift register and the feedback rule $$B(i) = B(i-5) XOR B(i-6) \quad (XOR = \text{Exclusive } OR)$$

the following bit sequence of cycle length $63 = 2^6 - 1$ is obtaineed:
LLLLLLOOOOOLOOOOLLOOOLOLOOLL-
LLOLOOOLLLOOLOOLOLLOLLLOLLOOL-
LOLOLO
Thus, any conceivable 6bit word occurs exactly once, with the exception of 000000. However, a 6th zero can be added to the group 00000. It is not prejudicial in the present embodiment that the shift counter would not run on after 00000.

What is claimed is:

1. An apparatus for digital measurement of an angle between first and second parts rotatable about a common axis, comprising:
   a disk rotatable at a constant angular velocity about the common axis;
   marks regularly distributed over said disk and forming a graduation, said graduation having at least one irregularity in a displacement of one edge in at least one of said marks, said one mark forming a reference mark, an opposite edge of said one mark be displayed in a regular manner relative to corresponding edges of the other marks;
   a space between each adjacent pair of said marks such that one of the spaces and one of said marks forms one graduation interval; and
   first and second pick-up means, rigidly coupled to the first and second parts, respectively, for scanning said marks on said disk and producing alternating signals therefrom with a phase difference varing by $2\pi$ when one of the parts changes a position thereof relative to the other part by one graduation interval;
   whereby the angle between said pick-up means can be measured by counting the number of entire graduation intervals between passages of said reference mark.

2. An apparatus as defined in claim 1 wherein edges of adjacent marks are parallel to each other.

3. An apparatus as defined in claims 1 wherein said displacement produces a width of said reference mark different from widths of the other marks.

4. An apparatus as defined in claim 3 wherein at least one of a leading edge and a trailing edge of one of the marks is displaced.

5. An apparatus as defined in claim 1 wherein a width of one regular mark is approximately ⅔ of a length of the graduation interval; and wherein a width of the reference mark is approximately one half of a width of the regular mark.

6. An apparatus for digital measurement of an angle between first and second parts rotatable about a common axis, comprising:
   a disk rotatable at a constant angular velocity about the common axis;
   marks regularly distributed over said disk and forming a graduation;
   a space between each adjacent pair of said marks such that one of the spaces and one of said marks forms one graduation interval;
   first and second pick-up means, rigidly coupled to the first and second parts, respectively, for scanning said marks on said disk and producing alternating signals therefrom with a phase difference varing by $2\pi$ when one of the parts changes a position thereof relative to the other part by one graduation interval;
   at least one reference interval in said graduation, said reference interval including graduation subintervals of marks and spaces therebetween; and
   at least one irregularity in said graduation, said irregularity being a displacement of one edge of at least one of said marks in at least one of said subintervals such that said one mark is of changed form and represents a reference mark.

7. An apparatus as defined in claim 6 wherein 2n reference intervals are equidistantly positioned in the graduation, each said reference interval comprising n+1 graduation subintervals placed successively in a movement direction of the disk, the first of said graduation subintervals including said reference mark; and wherein the marks and the spaces in the remaining n graduation subintervals represent a binary coding of the respective reference interval.

8. An apparatus as defined in claim 6 wherein 2n reference intervals are equidistantly positioned in the graduation, each reference interval comprising first and second graduation subintervals, the first subinterval including said reference mark, the second subintervals including code bits selected such that the code bits of the reference intervals form a cyclic code wherein n successive code bits represent an unique identification of the position on the graduation.

9. An apparatus as defined in claim 6 wherein edges of adjacent marks are parallel to each other.

10. An apparatus as defined in claim 6 wherein said displacement produces a width of said reference mark different from widths of the other marks in the graduation subinterval.

11. An apparatus as defined in claim 9 where at least one of a leading edge and a trailing edge of one of the marks is displaced.

* * * * *